(12) United States Patent
Novack

(10) Patent No.: US 7,792,270 B2
(45) Date of Patent: *Sep. 7, 2010

(54) INTEGRATED DISPARATE INTELLIGENT PERIPHERALS

(75) Inventor: Brian M. Novack, St. Louis, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/391,921

(22) Filed: Feb. 24, 2009

(65) Prior Publication Data

US 2009/0154683 A1    Jun. 18, 2009

Related U.S. Application Data

(63) Continuation of application No. 11/941,238, filed on Nov. 16, 2007, now Pat. No. 7,526,080, which is a continuation of application No. 11/690,229, filed on Mar. 23, 2007, now Pat. No. 7,317,792, which is a continuation of application No. 10/608,076, filed on Jun. 30, 2003, now Pat. No. 7,215,755.

(51) Int. Cl.
| | |
|---|---|
| H04M 7/00 | (2006.01) |
| H04M 1/64 | (2006.01) |
| H04M 3/56 | (2006.01) |
| H04M 3/58 | (2006.01) |

(52) U.S. Cl. .............................. 379/221.11; 379/88.18; 379/207.01; 379/212.01; 379/265.02

(58) Field of Classification Search .............. 379/88.01, 379/88.16–88.17, 207.01, 212.01, 221.11, 379/265.01–266.1

See application file for complete search history.

(56) References Cited

U.S. PATENT DOCUMENTS

| | | | |
|---|---|---|---|
| 5,530,742 A | 6/1996 | Taylor et al. | |
| 5,572,583 A | 11/1996 | Wheeler, Jr. et al. | |
| 5,838,768 A | 11/1998 | Sumar et al. | |
| 5,915,011 A | 6/1999 | Miloslavsky | |
| 5,915,012 A | 6/1999 | Miloslavsky | |
| 6,055,306 A | 4/2000 | Lozinski et al. | |
| 6,195,357 B1 | 2/2001 | Polcyn | |
| 6,208,856 B1 | 3/2001 | Jonsson | |
| 6,256,381 B1 | 7/2001 | Donaghue, Jr. | |
| 6,366,658 B1 | 4/2002 | Bjornberg et al. | |
| 6,408,064 B1 * | 6/2002 | Fedorov et al. | 379/265.06 |
| 6,418,216 B1 | 7/2002 | Harrison et al. | |
| 6,445,782 B1 | 9/2002 | Elfe et al. | |
| 6,600,736 B1 | 7/2003 | Ball et al. | |
| 7,012,998 B1 | 3/2006 | Blackurn et al. | |
| 7,046,785 B2 | 5/2006 | Sweeney et al. | |
| 7,215,755 B2 | 5/2007 | Novack | |
| 7,317,792 B2 | 1/2008 | Novack | |
| 7,526,080 B2 * | 4/2009 | Novack | 379/221.11 |
| 2001/0046278 A1 | 11/2001 | Campbell et al. | |
| 2001/0053206 A1 | 12/2001 | Muller | |
| 2002/0136381 A1 | 9/2002 | Shaffer et al. | |

* cited by examiner

*Primary Examiner*—Harry S Hong
(74) *Attorney, Agent, or Firm*—Greenblum & Bernstein, P.L.C.

(57) ABSTRACT

A method for providing a service includes monitoring, by a first networked communications apparatus, interaction between a second networked communications apparatus and a remote requesting party over a first communications network. The method also includes interacting, by the first networked communications apparatus, with the remote requesting party over the first communications network upon detecting a predetermined action in monitoring the interaction between the second networked communications apparatus and the remote requesting party over the first communications network.

21 Claims, 6 Drawing Sheets

INTEGRATED DISPARATE INTELLIGENT PERIPHERALS

CROSS REFERENCE APPLICATIONS

This application is a continuation of pending U.S. patent application Ser. No. 11/941,238, filed Nov. 16, 2007, which is a continuation of U.S. patent application Ser. No. 11/690,229, filed Mar. 23, 2007, now U.S. Pat. No. 7,317,792, which is a continuation of U.S. patent application Ser. No. 10/608,076, filed Jun. 30, 2003, now U.S. Pat. No. 7,215,755, the disclosures of which are expressly incorporated herein by reference in their entireties.

BACKGROUND OF THE INVENTION

1. Field of the Invention

The present invention relates to telecommunications. More particularly, the present invention relates to a telecommunications system with disparate intelligent peripherals that provide an integrated telecommunications service for a call from a calling party calling a service number.

2. Background Information

A need exists to aggregate the services provided by a telecommunications system with multiple disparate intelligent peripherals. For example, the functionality of one interactive voice response device may not be available on another interactive voice response device due to technical considerations. As a result, a service offered by an interactive voice response device may be unnecessarily limited because a particular function or service is unavailable, even though the function or service is available from another interactive voice response device in the telecommunications network.

An intelligent peripheral may not be able to support a particular function or service because the function or service uses a protocol that is not supported by the intelligent peripheral. Furthermore, the intelligent peripheral may not have the processing ability or available memory to support a highly complex program developed long after the intelligent peripheral is produced and installed.

In addition, when improvements can be made to an intelligent peripheral service, the improvements may have to be entirely provisioned for each intelligent peripheral that offers the service. A service provider may not be able to justify the costs to upgrade the functionality of every intelligent peripheral that would benefit from the new or upgraded function or service.

Accordingly, a need exists for a system that integrates the services of multiple disparate intelligent peripherals. For example, an intelligent peripheral is needed that will recognize when to obtain the services of another intelligent peripheral. Additionally, an intelligent peripheral is needed for initiating communications with another intelligent peripheral so that the services of the other intelligent peripheral can be provided to a calling party. Moreover, intelligent peripherals are needed that can interact with each other in order to coordinate the services provided to a calling party. In addition, a system is needed that integrates the services of disparate intelligent peripherals using communications networks such as the public switched telephone network (PSTN) and/or an advanced intelligent network (AIN).

To solve the above-described problems, a system is provided for integrating the services of multiple disparate intelligent peripherals.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
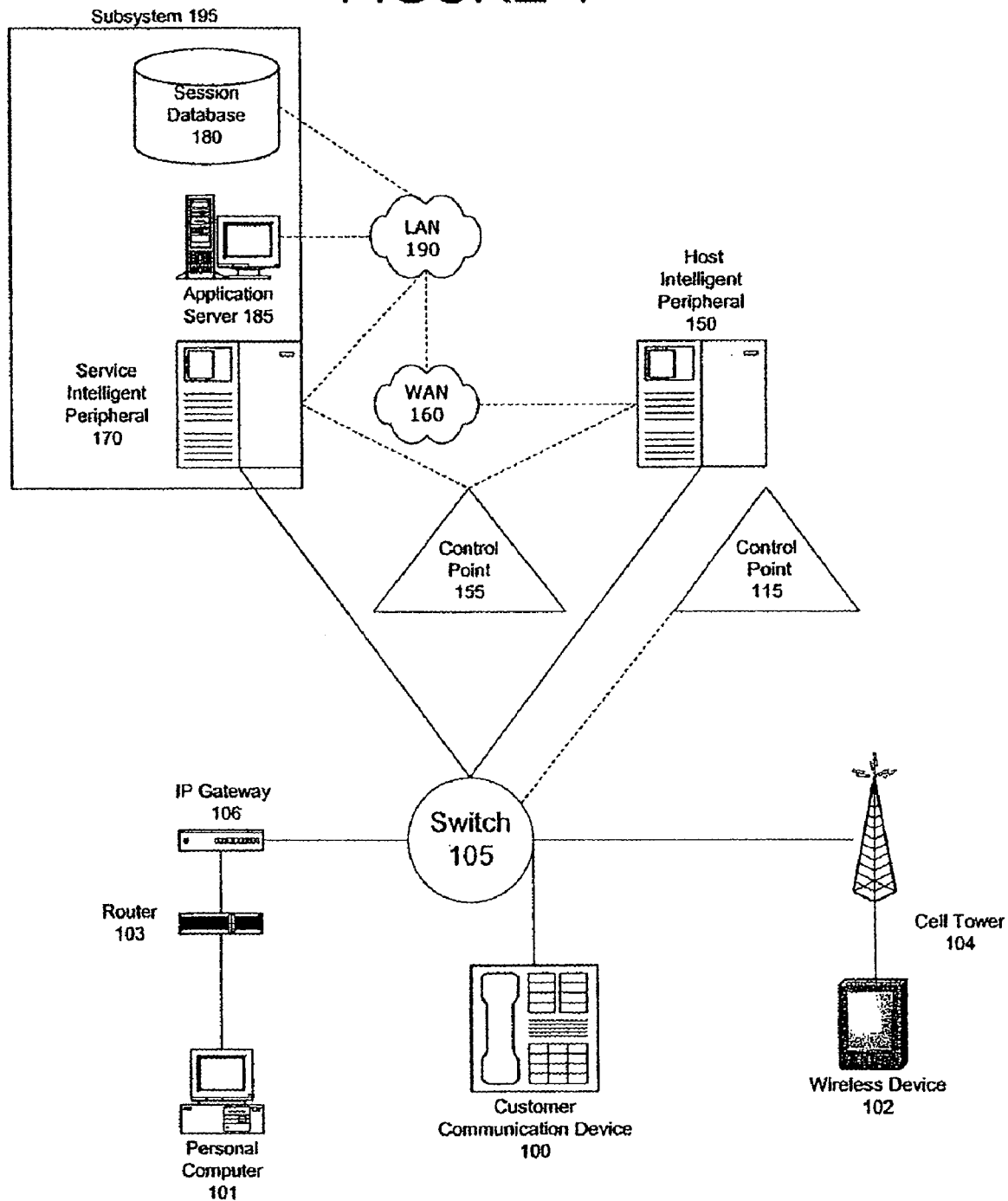
FIG. 1 shows an exemplary telecommunications network architecture for the integrated disparate intelligent peripherals, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a first intelligent peripheral provides a telecommunications service to a calling party. The first intelligent peripheral includes a receiver that receives a call from the calling party. The first intelligent peripheral interacts with the calling party. A determiner determines whether to contact a second intelligent peripheral based on the interaction with the calling party. A call initiator establishes a call connection with the second intelligent peripheral. The second intelligent peripheral interacts with at least one of the calling party and the first intelligent peripheral to provide the telecommunications service.

According to another aspect of the present invention, the interaction between the first intelligent peripheral and the second intelligent peripheral is an exchange of signals that includes at least one of predetermined dual tone multifrequency signals, prerecorded speech and computer generated speech.

According to still another aspect of the present invention, the first intelligent peripheral includes a creator that creates a session information entry for a session database that stores the entry. The entry includes information related to the call. The entry is retrieved from the session database by the second intelligent peripheral. The information related to the call is updated by the second intelligent peripheral, and the second intelligent peripheral is disconnected from the call after updating the information related to the call. According to yet another aspect of the present invention, the first intelligent peripheral includes a retriever that retrieves the updated session information entry from the session database for the first intelligent peripheral to resume interaction with the calling party. According to another aspect of the present invention, the calling party includes a computer processor.

According to an aspect of the present invention, a telecommunications system provides a telecommunications service to a calling party. The telecommunications system includes a first intelligent peripheral that receives a call from a calling party. A second intelligent peripheral is also provided. The first intelligent peripheral interacts with the calling party and determines whether to contact the second intelligent peripheral based on the interaction with the calling party. The first intelligent peripheral establishes a call connection with the second intelligent peripheral. The second intelligent peripheral interacts with at least one of the calling party and the first intelligent peripheral to provide the telecommunications service.

According to an aspect of the present invention, a method for providing a telecommunications service to a calling party uses a plurality of intelligent peripherals. The method includes receiving a call from the calling party at a first intelligent peripheral. The first intelligent peripheral interacts with the calling party. The method also includes determining whether to contact a second intelligent peripheral based on the interaction with the calling party. A call connection is established with the second intelligent peripheral. The second intelligent peripheral interacts with at least one of the calling party and the first intelligent peripheral to provide the telecommunications service.

According to another aspect of the present invention, the interaction between the first intelligent peripheral and the second intelligent peripheral is an exchange of signals that include at least one of dual tone multifrequency signals, prerecorded speech and computer generated speech.

According to still another aspect of the present invention, the method includes forwarding an entry that includes information related to the call from the first intelligent peripheral to a session database. According to still another aspect of the present invention, the method includes forwarding an update including information related to the call from the second intelligent peripheral to update the entry of the session database. According to another aspect of the present invention, the method includes disconnecting the second intelligent peripheral from the call.

According to still another aspect of the present invention, the method includes retrieving an updated entry from the session database and resuming interaction with the calling party. The updated entry is updated by the second intelligent peripheral.

According to another aspect of the present invention, a three way call is established by bridging the call between the calling party and the first intelligent peripheral with the call between the first intelligent peripheral and the second intelligent peripheral.

According to an aspect of the present invention, a computer readable medium stores a program that provides a telecommunications service to a calling party using a plurality of intelligent peripherals. The computer readable medium includes a first call interaction source code segment at a first intelligent peripheral that receives a call from the calling party. The first call interaction source code segment interacts with the calling party. A determining source code segment determines whether to contact a second intelligent peripheral based on the interaction with the calling party. A call connection initiating source code segment initiates a call by establishing a call connection with the second intelligent peripheral. The second intelligent peripheral interacts with at least one of the calling party and the first intelligent peripheral to provide the telecommunications service.

According to another aspect of the present invention, the interaction between the first intelligent peripheral and the second intelligent peripheral is an exchange of signals that include at least one of dual tone multifrequency signals, prerecorded speech and computer generated speech.

According to still another aspect of the present invention, the computer readable medium includes an entry forwarding source code segment that forwards an entry. The entry includes information related to the call. The entry is forwarded from the first intelligent peripheral to a session database. According to yet another aspect of the present invention, the computer readable medium also includes an update retrieving source code segment that retrieves the update from the session database and resumes interaction with the calling party after the second intelligent peripheral is disconnected from the call.

According to another aspect of the present invention, the computer readable medium includes a call bridging source code segment that establishes a three way call by bridging the call between the calling party and the first intelligent peripheral with the call between the first intelligent peripheral and the second intelligent peripheral.

According to an aspect of the present invention, a computer readable medium stores a program that provides a telecommunications service to a calling part using a plurality of intelligent peripherals. The computer readable medium includes a call connection initiating source code segment at a first intelligent peripheral that receives a call from a second intelligent peripheral. The first intelligent peripheral interacts with at least one of the calling party and the second intelligent peripheral to provide the telecommunications service. A call interaction source code segment at the first intelligent peripheral interacts with at least one of the calling party and the second intelligent peripheral.

According to another aspect of the present invention, the computer readable medium includes an entry retrieving source code segment that retrieves an entry from a session database. The entry includes information related to interaction between the calling party and the second intelligent peripheral.

According to still another aspect of the present invention, the computer readable medium includes an updated entry forwarding source code segment that forwards an updated entry to the session database. The updated entry includes information related to the interaction between the first intelligent peripheral and at least one of the calling party and the second intelligent peripheral.

According to yet another aspect of the present invention, the interaction between the first intelligent peripheral and the second intelligent peripheral is an exchange of signals that include at least one of dual tone multifrequency signals, prerecorded speech and computer generated speech.

A telecommunications system is provided for integrating the services of multiple disparate intelligent peripherals. The telecommunications system includes a switching network, a host intelligent peripheral and a service intelligent peripheral.

The switching network may be an advanced intelligent network (AIN) that includes service switching points and service control points. A service switching point is connected to an individual communications device, such as a phone or modem. The service switching point responds to particular dialing patterns or sequences input to the individual communications device. The service switching point triggers when it detects a predetermined dialing pattern and sends a query via a signaling network to a service control point. The query to the service control point results in an instruction to forward the call from the service switching point to a host intelligent peripheral.

In an embodiment, the host intelligent peripheral may correspond to a telephone number, IP address, or other destination identifier for which calls are routed through a switching network without a need to trigger a service switching point of an advanced intelligent network. Accordingly, a telephone call may be routed through the telecommunications system to the host intelligent peripheral without instruction from a service control point, even in a network where a service control point is otherwise provided.

The host intelligent peripheral may be an interactive voice response device or any other type of device loaded with interactive voice response functionality. The interactive voice response functionality may include, e.g., DTMF recognition and prerecorded messages that instruct the calling party to input data by punching a keypad of the calling party's phone or speaking. The host intelligent peripheral may also include a text-to-speech processor that dynamically converts text data into audible signals that can be presented to the calling party. The host intelligent peripheral may also include a speech-to-text processor that converts audible signals from the calling party to text data that is processed by the host intelligent peripheral. An exemplary telecommunications service provided using intelligent peripherals is disclosed in U.S. patent application Ser. No. 10/200,977 to BOOK et al., filed Jul. 24, 2002, the disclosure of which is expressly incorporated by reference herein in its entirety.

Speech recognition functionality, such as speech recognition software, available from, e.g., SpeechWorks, International, or Nuance Communications, may be provided at an intelligent peripheral. The speech recognition software may receive and interpret voice input from the calling party. Accordingly, an intelligent peripheral may receive and interpret voice input and touch tone DTMF signals from the calling party, as long as the intelligent peripheral has an interactive voice response capability and/or speech recognition software.

The host intelligent peripheral may be a service node/intelligent peripheral that independently determines a sequence of instructions to forward to the calling party. A service node/intelligent peripheral (SN/IP) can be a computer or communications server linked to the switch via, for example, an ISDN link using either ISDN-BRI (Basic Rate Interface) or an ISDN-PRI (Primary Rate Interface) protocol, each of which is known in the art. In another embodiment, the SN/IP can be linked to the switch by, e.g., an analog line, a data line, or high-capacity trunks. A SN/IP may contain resources to offer service enhancements to calling parties of a telecommunications service provider. A SN/IP may combine computer telephony integration (CTI) and advanced speech technologies in a single platform used as a system resource. For example, a SN/IP may provide voice-print authentication, speaker verification, speech recognition, text-to-speech/speech-to-text conversion and dual-tone multi-frequency (DTMF) recognition with external telephony resources.

In an embodiment, the host intelligent peripheral may provide the responses to, and receive instructions from, a service control point that processes data from the sequence of speech or dual tone multi frequency signals received from the calling party, and that determines the response to provide to the calling party. The host intelligent peripheral and the service control point communicate over a signaling network such as the SS7 network. An intelligent peripheral may internally translate data messages received from a service control point through the SR-3511 protocol, the use of which enables simultaneous compatibility with interactive voice response functionality. Details of the SR-3511 protocol are provided in Telcordia, Recommendations SR-3511 SCP Intelligent Peripheral (IP) Interface Specification for TCP/IP, Version 5.0 (January 1997), the disclosure of which is expressly incorporated by reference herein in its entirety. In an embodiment, the translation program can be coded in C, C++ or JAVA.

Regardless of whether the host intelligent peripheral is self directing or under the control of a service control point, the host intelligent peripheral receives the speech and/or dual tone multi frequency signals from the calling party and provides the responses to the calling party. When, during the interaction between the calling party and the host intelligent peripheral, a determination is made that the functionality of a service intelligent peripheral should be requested, the host intelligent peripheral initiates communication with the service intelligent peripheral by, e.g., establishing another connection with the service intelligent peripheral and then bridging the two connections. The service intelligent peripheral interacts with the calling party until the functionality of the service intelligent peripheral is no longer needed. The service intelligent peripheral is disconnected and the host intelligent peripheral resumes interaction with the calling party. Accordingly, the disparate host and service intelligent peripherals are integrated to provide a service for a calling party.

FIG. 1 shows an exemplary service architecture of the telecommunications system of the present invention. As shown, an individual communications device 100 is connected to a switch 105 of the public switched telephone network (PSTN). In the alternative, an individual communications device 102 may be a cellular telephone or other wireless device that communicates with the switch 105 via a cellular tower 104.

In an embodiment, a personal computer 101 may be used to connect with the switch 105 via a router 103 and an internet protocol gateway 106. The router 106 is used to route packets according to a packet-switching protocol, e.g., transmission control protocol/internet protocol (TCP/IP). The internet protocol gateway 106 is an interface between the packet-switched network that includes the router 103 and the PSTN and/or AIN that includes the switch 105. The personal computer 101 may be used by a calling party to route, e.g., voice over internet protocol (VOIP), packets that are converted at the internet protocol gateway 106 for transmission over a dedicated line to the switch 105.

According to an aspect of the present invention, the switch 105 is set with an originating trigger that responds to a particular dialing pattern, such as an 800 dialing pattern used for a telecommunications service provided by the host intelligent peripheral 150. In response to the trigger, the switch 105 suspends the call and launches a Info Analyzed query to a control point 115 through signaling transfer points (not shown).

The switch 105, the signaling transfer points, and the control point 115 may be components of an Advanced Intelligent Network, as is known in the art. The switch 105 and the control point 115 may communicate with each other over a SS7 network using a standard interface protocol. In an embodiment, the interface protocol used by the switch 105 and the service control point 115 to communicate is SS7 protocol.

In response to receiving the query from the switch 105 the control point 115 processes the query and transfers control to common service logic, which determines a routing solution for the call. In response to the query, the control point 115 executes its internal Called Number Identifier service logic and signals back to the inquiring switch 105 a Forward Call response with the destination routing number corresponding to the host intelligent peripheral 150. The switch 105 forwards the call to the host intelligent peripheral 150 through a switching network.

The host intelligent peripheral 150 may be an interactive voice response device or another type of intelligent peripheral device provisioned with interactive voice response functionality. Exemplary interactive voice response devices include a service node/intelligent peripheral, such as an IBM Resource Manager, a Lucent Compact Service Node or a Lucent Enhanced Media Resource Server (eMRS). The host intelligent peripheral 150 plays an introductory message to the calling party. The introductory message may include a request for the calling party to input information by speaking or pressing buttons on a keypad to generate dual-tone multi frequency (DTMF) tones. The buttons on the keypad each correspond to a distinctive DTMF tone that is received by the host intelligent peripheral 150.

The host intelligent peripheral 150 receives the information and translates speech or DTMF tones into data. In the case where the host intelligent peripheral 150 is a service node/intelligent peripheral, the host intelligent peripheral 150 independently determines the call flow. However, in the case where the call flow of the host intelligent peripheral 150 is subject to the control of a control point, the host intelligent peripheral 150 forwards the data to the control point 155, and the control point 155 instructs the host intelligent peripheral 150 to play messages to the calling party.

Accordingly, the call flow logic of the host intelligent peripheral 150 may be loaded into the host intelligent peripheral 150 if it is a service node/intelligent peripheral. Alternatively, the call flow logic is loaded into a control point 155 that is associated with the host intelligent peripheral 150 and that controls at least part of the call flow of the host intelligent peripheral 150.

According to the present invention, when the call flow of the host intelligent peripheral 150 reaches a point where the functionality of a service intelligent peripheral 170 is to be requested, the host intelligent peripheral 150 initiates a communication, e.g., a three way call, with the service intelligent peripheral 170 via the switch 105. A three way call can be initiated using, for example, a flash hook mechanism that suspends the first call while a second call is placed by the host intelligent peripheral 150. The first call and the second call are then bridged, via a second flash hook mechanism, into a three way call. When the functionality of the service intelligent peripheral 170 is no longer needed, the three way call is ended using, for example a third flash hook mechanism, so that only the calling party and the host intelligent peripheral 150 remain on the call.

Alternatively, the call may be redirected using a two B channel transfer (TBCT) methodology. In the case of a two B channel transfer mechanism used to transfer the call to the service intelligent peripheral 170, the two B channel transfer mechanism is again used to transfer the call back to the host intelligent peripheral 150 by the service intelligent peripheral 170 when the service intelligent peripheral 170 is finished processing the call. In the case where the call is redirected, the host intelligent peripheral 150 and the service intelligent peripheral 170 may communicate indirectly, e.g., through the control point 155, to coordinate the transfer of the call and the call flow with the calling party.

In an embodiment, the call flow with the calling party may be coordinated between the intelligent peripherals 150, 170 by forwarding the call flow sequence to a session database 180 as an entry after each intelligent peripheral 150, 170 is finished with the calling party. When the session database 180 is used, the intelligent peripherals 150, 170 retrieve the original or updated session information entry from the session database 180 before interacting with the calling party. When the two B channel transfer mechanism is used, the call can be transferred from one intelligent peripheral 150, 170 to the other, a session ID of the session information entry can be indirectly sent from one intelligent peripheral 150, 170 to the other via, e.g., the control point 155 and a SS7 network, and the updated call flow information can be forwarded and retrieved from the session database 180 as an entry corresponding to the session ID.

In the case where a three way call is established, the host intelligent peripheral 150 and the service intelligent peripheral 170 are loaded with logic that enables direct communication between the two. The host intelligent peripheral 150 may be programmed to forward a particular series of DTMF tones to the service intelligent peripheral 170 so that the service intelligent peripheral 170 recognizes the functionality required for the calling party. In another embodiment, the host intelligent peripheral 150 may be programmed to forward a particular analog audio signal, e.g., a prerecorded or computer generated speech segment, to the service intelligent peripheral 170 so that the service intelligent peripheral 170 recognizes the functionality required for the calling party. The host intelligent peripheral 150 and the service intelligent peripheral 170 may interact before the three way call is completely established, e.g., before a second flash hook is performed to bridge the two calls at the switch 105.

The host intelligent peripheral 150 and the service intelligent peripheral 170 may interact after the second flash hook is performed also, although each intelligent peripheral 150, 170 will need to determine when it is being addressed by, e.g., a DTMF tone. In an embodiment, the host intelligent peripheral 150 will only monitor the call flow for specific messages, such as an end of call DTMF signal generated by the service intelligent peripheral 170. The host intelligent peripheral 150 may also monitor the call flow for specific speech patterns from the calling party, such as "Help", "Menu", "Operator" or any other term that it is programmed to acknowledge.

The host intelligent peripheral 150 may also monitor the call flow for a predetermined prefix of DTMF tones for signals from the service intelligent peripheral 170, so that the host intelligent peripheral 150 recognizes when it is being addressed. Accordingly, after a three way call is established, the host intelligent peripheral 150 will monitor the call flow to recognize when it is being addressed by a speech message or DTMF signal. The host intelligent peripheral 170 will remain passive until a predetermined sequence of speech information or DTMF tones is recognized.

After the second call is initiated by the first flash hook and before the three way call is established by the second flash hook, the intelligent peripherals 150, 170 may exchange information directly using, e.g., DTMF tones, prerecorded or computer generated speech. For example, DTMF tones may be used to exchange the session ID for the session information entry that has been forwarded to the session database 180. The host intelligent peripheral 150 may be programmed to monitor DTMF tones for predetermined addressing prefixes or predetermined sequences, e.g., end of session tones, only during the three way portion of a call, e.g., after a second flash hook is performed by the host intelligent peripheral 150.

In an embodiment, the host intelligent peripheral 150 may communicate with the service intelligent peripheral 170 through, for example, a wide area network 160 and/or a local area network 190. Alternatively, as has been described, the host intelligent peripheral 150 may communicate with the service intelligent peripheral 170 through the control point 155 and/or the switch 105, in addition to the wide area network 160 and the local area network 190, depending on the programming logic provided to the host intelligent peripheral 150 and the service intelligent peripheral 170.

The local area network 190 may be used for local communications in a subsystem 195 that includes the service intelligent peripheral 170. The subsystem 195 includes a session database 180 that records information transacted between the calling party, the host intelligent peripheral 150 and the service intelligent peripheral 170. The session database 180 may be connected to the host intelligent peripheral 150 through the local area network 190 and/or the wide area network 160. The host intelligent peripheral 150 forwards the call session information entry to the session database 180 so that the service intelligent peripheral 170 can retrieve the entry information before interacting with the calling party. The service intelligent peripheral 170 updates the call session information entry and forwards the updated session information entry to the session database 180 before the host intelligent peripheral 150 resumes interaction with the calling party when the service intelligent peripheral 170 is finished interacting with the calling party. In this manner, once the determination is made to request the functionality of the service intelligent peripheral 170, each of the host intelligent peripheral 150 and the service intelligent peripheral 170 are made aware of the previous call session information before interacting with the calling party.

The subsystem 195 may also include an application server 185 that processes the data collected by the service intelligent peripheral 170 based on speech information or DTMF tone information from the calling party. Additionally, the subsystem 195 may include additional databases (not shown) that store instructions used to process the data from the calling party. The application server 185 may be used to retrieve the instructions from the additional database(s) to process information from the calling party and determine the call flow.

As an example of the uses of the telecommunications network architecture shown in FIG. 1, a telecommunications service provider may allow subscribers to review service information by calling a service number corresponding to the host intelligent peripheral 150. The information may be, for example, call forwarding information, call blocking information, call routing information, voicemail platform information or any other information associated with the telecommunications service provided to the calling party. Additionally, the telecommunications system may allow the calling party to request changes to the service using the host intelligent peripheral 150. However, the telecommunications service provider may require additional functionality that is not available from the host intelligent peripheral 150 in order to process a particular request for a change in service, such as call forwarding or a change of password for a voicemail service. Accordingly, when the call flow of the call to the host intelligent peripheral 150 reaches the point where the calling party requests to update their call forwarding service, the host intelligent peripheral 150 initiates the three way call to the service intelligent peripheral 170.

As an example, the additional functionality may be functionality required to determine that a forwarding number is a valid number that can be used by the calling party. Accordingly, the subsystem 195 with the service intelligent peripheral 170 may be centrally provided and associated with one or more exhaustive databases that the telecommunications service provider does not wish to associate with the host intelligent peripheral 150. Of course, the service intelligent peripheral 170 and the associated subsystem 195 may be duplicated according to, for example, different geographic regions. The subsystem 195 may be periodically updated, in order to more efficiently process requests that are forwarded to the service intelligent peripheral 170. Additionally, the service intelligent peripheral 170 and the associated subsystem 195 may be duplicated in order to provide redundancy such that corruption of one subsystem will not necessarily result in corruption of the other.

The databases associated with the service intelligent peripheral 170 may be any database that stores information for the service intelligent peripheral 170. In an embodiment, a database associated with the service intelligent peripheral 170 may be a Public Safety database of the type used by emergency call centers, or a Line Information Database (LIDB). The database may store full textual representations of a subscriber name and address or, in the alternative, abbreviations so that data may be efficiently stored. Data corresponding to subscribers of multiple telecommunications service providers may be divided among many databases dispersed in an advanced intelligent network by any criteria, such as different telecommunications service providers, and geography.

As another example of the uses of the telecommunications network architecture shown in FIG. 1, the host intelligent peripheral 150 may be used by a financial institution to allow a calling party to access an account. However, the financial institution may require the calling party to provide additional information in order to perform a transaction. Additionally, the financial institution may not wish to provide a transaction capability at the level of the host intelligent peripheral 150. Accordingly, the service intelligent peripheral 170 may be used to match information of the calling party with information of the account-holder. Additionally, the service intelligent peripheral 170 may be centrally located in order to limit the number of intelligent peripherals used to arrange financial transactions over the telecommunications network.

As yet another example, the service intelligent peripheral 170 may be used to change passwords and personal identification numbers. A telecommunications service provider may use a centrally located service intelligent peripheral 170 to minimize the number of intelligent peripherals used to request changes in passwords for a voicemail system. Additionally, a financial institution may use a centrally located service intelligent peripheral 170 to minimize the number of intelligent peripherals used to request changes in personal identification numbers for accounts. The service intelligent peripheral 170 may be associated with databases that store subscriber and customer information. Additionally, the service intelligent peripheral 170 may be more closely monitored than the host intelligent peripherals 150 that are used to reach the service intelligent peripheral 170. In an embodiment, the service intelligent peripheral 170 may only accept calls from one or more host intelligent peripherals 150, such that a calling party is blocked from calling the service intelligent peripheral 170 directly.

As has been noted, the call flow of the host intelligent peripheral 150 and the service intelligent peripheral 170 may be self-directed or may be subject to the control of an external processor such as a service control point 155 of an advanced intelligent network. When call service instructions are stored at or otherwise directly associated with a service control point, the intelligent peripherals 150, 170 may retrieve the service information from the service control point 130 using the SR-3511 protocol. When not specified below, the methods and call flows described herein for the host intelligent peripheral 150 and/or the service intelligent peripheral 170 may be substantially under the control of the control point 115, 155 or may be substantially under the control of logic programmed into the respective intelligent peripheral 150, 170.

Additionally, the intelligent peripherals 150, 170 may retrieve data from an external database, such as a Name and Address Database (not shown) through a generic data interface (GDI) server (not shown) using, for example, a GetData command. For example, the subsystem 195 associated with the service intelligent peripheral 170 may retrieve data from a database using a generic data interface server.

Accordingly, the telecommunications system of FIG. 1 enables the integration of the disparate intelligent peripherals 150, 170 so that the functionality of the service intelligent peripheral 170 can be used to enhance the service provided for a call to the host intelligent peripheral 150. The interaction between the host intelligent peripheral 150 and the service intelligent peripheral 170 may occur via the switch 105, the control point 155, wide area network 160 and a local area network 190, or any other device or system that supports direct or indirect communication between the intelligent peripherals 150, 170.

Figure 2:
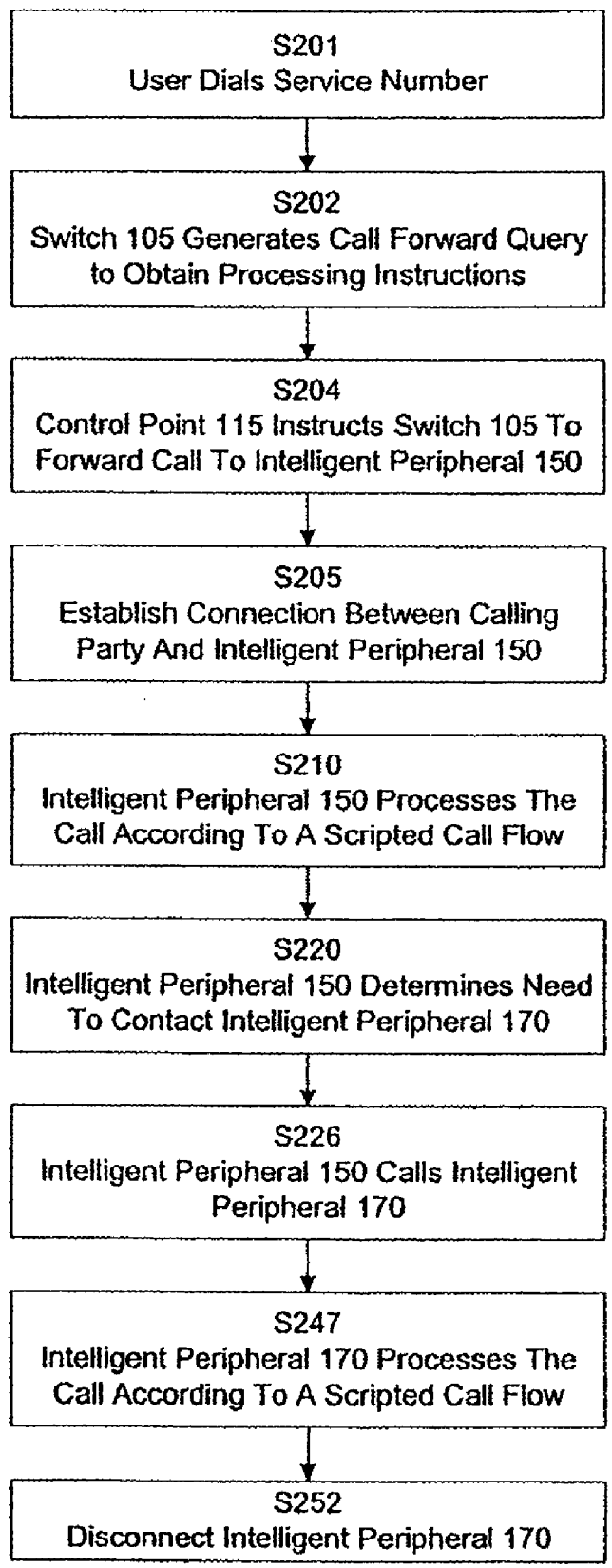
FIG. 2 is an exemplary flow diagram showing a method for using the integrated disparate intelligent peripherals, according to an aspect of the present invention.

FIG. 2 is an exemplary flow diagram showing a method for using the integrated disparate intelligent peripherals service architecture of the present invention. As shown, a calling party using an individual communications device 100 goes off hook and dials the service number to reach a service provided by the host intelligent peripheral 150 at S201. Upon receipt of the call, the switch 105 suspends the call and forwards a query to the control point 115 at S202. The control point 115 determines the call is for the service provided by the host intelligent peripheral 150 and sends a Forward_Call response to the switch 105 at S204. The switch 105 establishes a connection with the host intelligent peripheral 150 at S205.

The host intelligent peripheral 150 processes the call according to a scripted call flow at S210. The call flow may vary depending on the information input by the calling party. At S220, an instruction to contact the service intelligent peripheral 170 is processed by the host intelligent peripheral 150 as part of the scripted call flow. The instruction is processed, e.g., as a result of the calling party requesting a function that is not supported by the host intelligent peripheral 150. The host intelligent peripheral 150 is provisioned with logic to initiate a three way call to the service intelligent peripheral 170 and to interact with the service intelligent peripheral 170. At S226, the host intelligent peripheral 150 calls the service intelligent peripheral 170, e.g., after performing a first flash hook to obtain a new dial tone for calling the service intelligent peripheral 170. The service intelligent peripheral 170 is also provisioned with logic to accept the call from the host intelligent peripheral 150 and to interact with the host intelligent peripheral 150. At S247, the service intelligent peripheral 170 processes the call according to a scripted call flow. When the functionality of the service intelligent peripheral 170 is no longer needed, the service intelligent peripheral 170 is disconnected at S252. To disconnect from the call, the service intelligent peripheral 170 may generate, e.g., DTMF tones that are recognized by the host intelligent peripheral 150 to disconnect the service intelligent peripheral 170 from the call.

The call flow at S247 may include interaction between the host intelligent peripheral 150 and the service intelligent peripheral 170 before the three way call is established, i.e., before the call between the calling party and the host intelligent peripheral 150 is bridged with the call between the host intelligent peripheral 150 and the service intelligent peripheral 170 by a second flash hook mechanism. Once any necessary information is exchanged between the intelligent peripherals 150, 170, the calls may be bridged by the second flash hook mechanism. In an embodiment, once the three way call is established, the host intelligent peripheral 150 passively monitors the call until the service intelligent peripheral 170 generates, e.g., predetermined DTMF tones, prerecorded speech or computer generated speech, to signal an end of the call flow between the calling party and the service intelligent peripheral 170. When the predetermined DTMF tone(s) or speech is received, the host intelligent peripheral 150 performs a third flash hook to end the three way call. In another embodiment, the host intelligent peripheral 150 and the service intelligent peripheral 170 may communicate via the control point 155 or the wide area network 160 and/or the local area network 190. Accordingly, the host intelligent peripheral 150 and the service intelligent peripheral 170 interact in order to provide an integrated service to the calling party.

Figure 3:
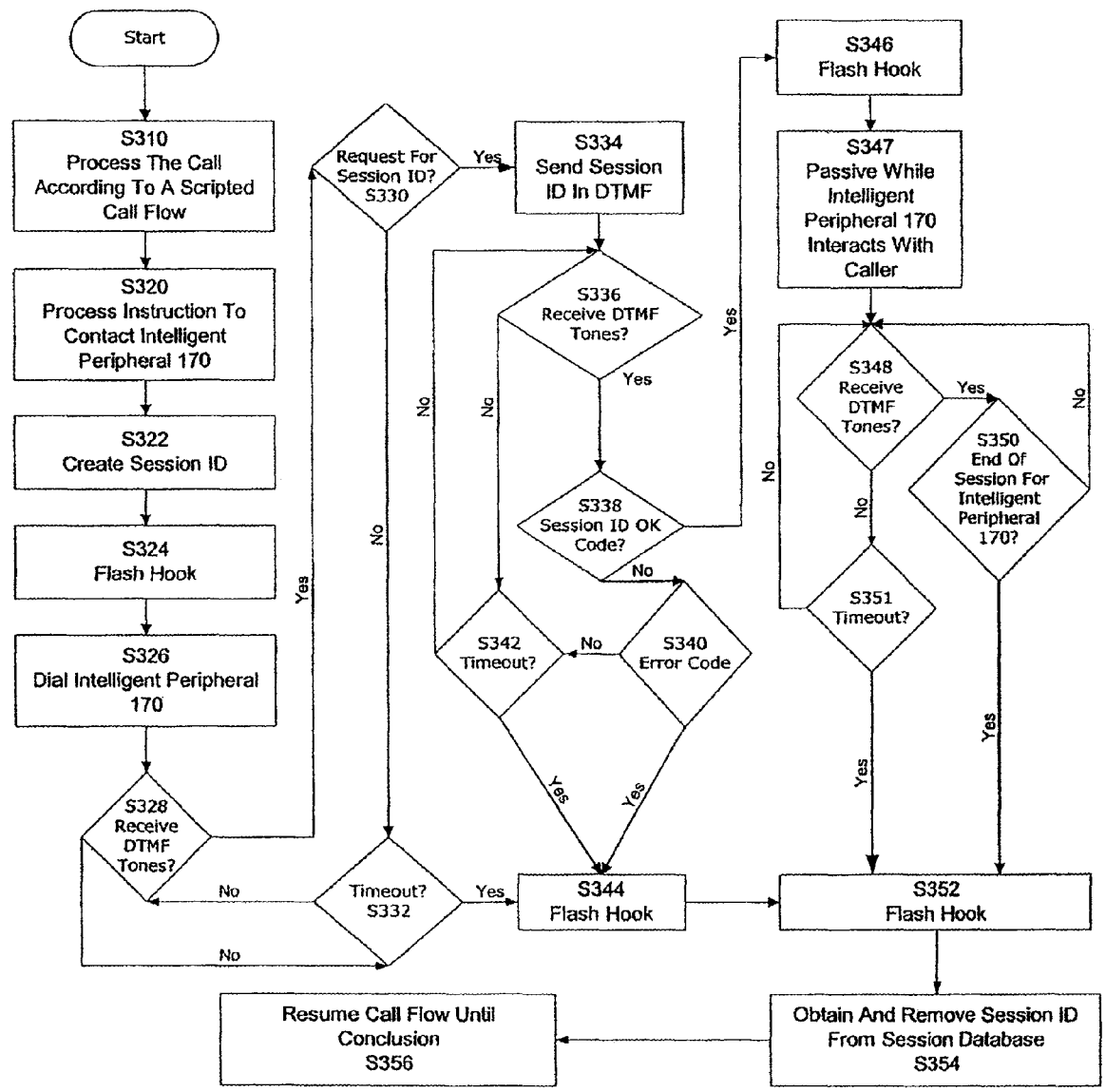
FIG. 3 is another exemplary flow diagram showing a method of operation for a host intelligent peripheral of the integrated disparate intelligent peripherals, according to an aspect of the present invention.

FIG. 3 shows an exemplary flow diagram of a method for using the host intelligent peripheral 150 of the integrated disparate intelligent peripherals. After starting, the call is processed at S310 according to a scripted call flow. At S310, the calling party interacts with the host intelligent peripheral 150 according to a predetermined script that is provided for the host intelligent peripheral 150. The predetermined script may be one or more software modules that include instructions. The script logic may branch depending on information provided by the calling party.

The calling party may request a function that is not provided by the host intelligent peripheral 150. Alternatively, the calling party may request information, e.g., billing information, that is not provided directly by the host intelligent peripheral 150. Whenever, for any reason, the call flow reaches a point where the services of the service intelligent peripheral 170 are to be requested, an instruction of the script being processed instructs the host intelligent peripheral 150 to contact the service intelligent peripheral 170 at S320.

When the host intelligent peripheral 150 is required to contact the service intelligent peripheral 170, the host intelligent peripheral 150 creates a session information entry for the session database 180 at S322. The session information entry includes information relating to the interaction between the calling party and the host intelligent peripheral 150. Additionally, the session information entry has a unique identifier that can be forwarded to the service intelligent peripheral 170 so that the service intelligent peripheral 170 can retrieve the session information entry.

At S324, the host intelligent peripheral 150 performs a flash hook to obtain a dial tone to dial the service intelligent peripheral 170. A flash hook is a process that can be used to establish a three way call. A first flash book is performed at S324 to obtain the dial tone. The host intelligent peripheral 150 dials the service intelligent peripheral 170 at S326. At S328, the host intelligent peripheral 150 waits for DTMF tones. In particular, the service intelligent peripheral 170 is expected to generate DTMF tones to request a session ID, so the host intelligent peripheral 150 waits for the DTMF tones after dialing the intelligent peripheral at S326. When a determination is made at S328 that DTMF tones are received, another determination is made at S330 whether the DTMF tones are the predetermined tones to request the session ID. If DTMF tones are not received at S328 (S328=No) or if the received DTMF tones are not a request for a session ID at S330 (S330=No), a determination is made at S332 whether a timeout has expired for waiting for the session ID request. If the timeout has expired (S332=Yes), a second flash hook is performed at S344 to initiate the three way call temporarily, and a third flash hook is performed at S352 to end the three way call by disconnecting the service intelligent peripheral 170. The second flash hook is performed to "bridge" the first call, between the calling party and the host intelligent peripheral 150, and the second call, between the host intelligent peripheral 150 and the service intelligent peripheral 170.

If the timeout period has not expired at S332, the system will again determine whether DTMF tones are received at S328, and whether received DTMF tones are a request for a session ID at S330. In this manner, the system waits for DTMF tones from the service intelligent peripheral 170 until a determination is made that either the timeout has expired at S332, or that received DTMF tones are a request for a session ID at S330.

When a determination is made at S330 that a request for a session ID has been received (S330=Yes), the host intelligent peripheral 150 sends DTMF tones corresponding to the session ID to the service intelligent peripheral 170 at S334. The host intelligent peripheral 150 then waits until DTMF tones are received again from the service intelligent peripheral 170 at S336. When the DTMF tones are received at S336 (S336=Yes), the host intelligent peripheral determines whether the DTMF tones correspond to a code indicating that the session ID is valid (OK) at S338. If the session ID is not valid at S338 (S338=No), a determination is made at S340 whether the DTMF tones received at S336 are an error code at S340. If the DTMF tones are not received at S336 (S336=No), or if the DTMF codes are not an error code at S340 (S340=No), a determination is made whether a timeout period has expired at S342. If the timeout period has not expired (S342=No), the host intelligent peripheral again waits for DTMF tones at S336. When a determination is made at S340 that the DTMF codes are an error code (S340=Yes), or when the timeout has expired at S342 (S342=Yes), the second flash hook is performed at S344 and the third flash hook is performed at S352 to disconnect the service intelligent peripheral 170 from the three way call.

If the DTMF tones indicate that the session ID is valid at S338 (S338=Yes), a second flash hook is performed at S346 to initiate the three way call so that the calling party can begin to interact with the service intelligent peripheral 170. The host intelligent peripheral 150 remains passive at S347 to monitor the DTMF tones that are transmitted by the calling party and/or the service intelligent peripheral 170. A determination is made whether DTMF tones are received during the passive period at S348. If the DTMF tones are received (S348=Yes), the host intelligent peripheral 150 determines at S350 whether the DTMF tones correspond to a predetermined signal from the service intelligent peripheral 170 that the service intelligent peripheral 170 has finished with the calling party. If the host intelligent peripheral 150 determines that DTMF tones are not received at S348 (S348=No), a determination is made at S351 whether a timeout has expired.

In an embodiment, the host intelligent peripheral 150 may also monitor the call flow at S347 for other DTMF tones such as a request from the calling party to cancel the transaction that invoked the functionality of the service intelligent peripheral 170. Additionally, the host intelligent peripheral 150 may monitor the call flow for any other signals from the calling party or the service intelligent peripheral 170. The host intelligent peripheral 150 may monitor, for example, speech from the calling party, voice prints from the calling party, out of band messages from a calling party or any other audio signals that are transmitted during the three way call. Of course, any action that the host intelligent peripheral 150 takes as a result of recognizing a signal will be coordinated with the service intelligent peripheral 170.

For example, if the calling party requests to cancel a transaction and return to the previous menu, e.g., at the host intelligent peripheral 150, the service intelligent peripheral 170 may automatically suspend its interaction with the calling party. The service intelligent peripheral 170 may also automatically forward the call flow information as an updated session information entry to the session database 180. Once the host intelligent peripheral 150 obtains the updated session information entry from the session database 180, the host intelligent peripheral 150 may resume interaction with the calling party. Of course, the host intelligent peripheral 150 and the service intelligent peripheral 170 may also coordinate the service being provided to the calling party by exchanging messages via the control point 155 and the SS7 network or via the wide area network 160.

If the DTMF tones are not an indication that the service intelligent peripheral 170 has finished with the calling party (S350=No), or if the timeout has not expired at S351 (S351=No), the system again waits for DTMF tones at S348. In this manner, the host intelligent peripheral 150 waits until either a determination is made at S350 that the service intelligent peripheral 170 has finished or a determination is made at S351 that a timeout has expired.

When the timeout has expired at S351 (S351=Yes) or when the DTMF tones indicate the end of the service intelligent peripheral's 170 portion of the call flow (S350=Yes), the third flash hook is performed at S352 to disconnect the service intelligent peripheral 170.

At S354, the host intelligent peripheral 150 obtains an updated session information entry corresponding to updated information of the call resulting from the calling party's interaction with the service intelligent peripheral 170. The host intelligent peripheral 150 then resumes the scripted call flow at S356 using any information collected from the service intelligent peripheral 170.

According to the embodiment of FIG. 3, when the three way call is established at S346, the host intelligent peripheral 150 monitors DTMF tones at S347 until a determination is made that an end code is received at S350. The end code will be generated by the service intelligent peripheral 170. Accordingly, the service intelligent peripheral 170 controls the call from the time of the flash hook at S346 until the host intelligent peripheral 150 drops the service intelligent peripheral 170 from the call at S352.

In an embodiment, information may be passed between the host intelligent peripheral 150 and the service intelligent peripheral 170 using, for example, the control point 155 or the wide are network 160. Accordingly, the interaction and coordination between the intelligent peripherals 150, 170 need not occur via the switch 105. For example, the call may be rerouted from the host intelligent peripheral 150 to the service intelligent peripheral 170, in which case information between the intelligent peripherals may be exchanged using a SS7 signaling network and the control point 155. Accordingly, the calling party can obtain the integrated services of the disparate intelligent peripherals 150, 170 as a result of the interaction and coordination between the host intelligent peripheral 150 and the service intelligent peripheral 170.

Figure 4:
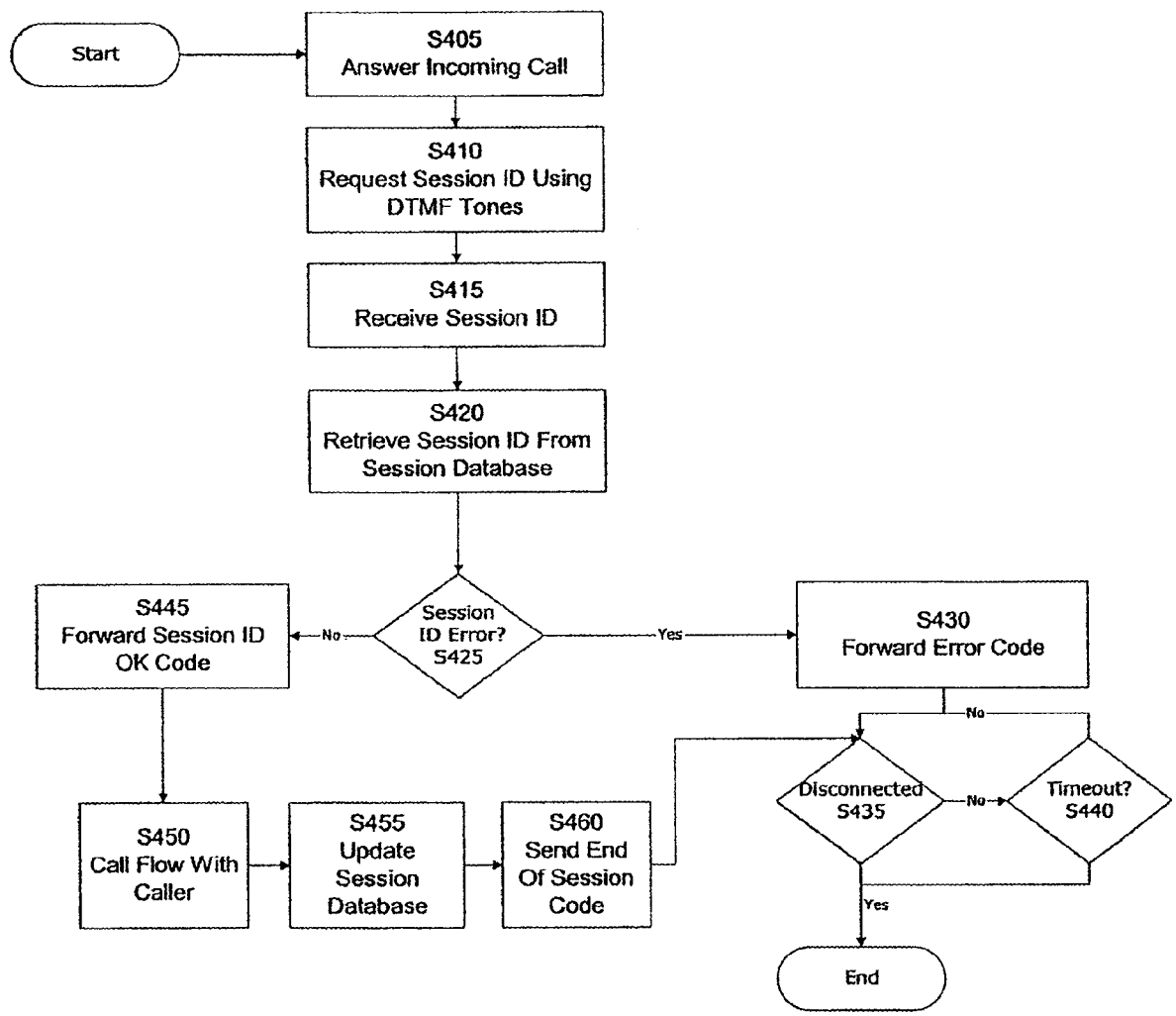
FIG. 4 is another exemplary flow diagram showing a method of operation for a service intelligent peripheral of the integrated disparate intelligent peripherals, according to an aspect of the present invention.

FIG. 4 shows an exemplary flow diagram for using the service intelligent peripheral 170 of the integrated disparate intelligent peripherals. After the process starts, an incoming call from the host intelligent peripheral 150 is answered at S405. At S410, the service intelligent peripheral 170 generates DTMF tones to request the session ID from the host intelligent peripheral 150. At S415, DTMF tones that correspond to the session ID are received. At S420, the service intelligent peripheral 170 retrieves the session information entry from the session database 180.

At S425, a determination is made whether the session ID is valid. The determination may be made by, for example, determining whether the session ID corresponds to information of a session information entry recently collected by the host intelligent peripheral 150. If the session ID is erroneous (S425=Yes), an error code is generated and forwarded to the host intelligent peripheral 150 at S430. The service intelligent peripheral 170 determines whether it has been disconnected from the call at S435. If the service intelligent peripheral 170 has not been disconnected (S435=No), a determination is made whether a timeout has occurred at S440. If the timeout has not expired at S440 (S440=No), a determination is again made whether the host intelligent peripheral 150 has disconnected the service intelligent peripheral 170 from the call at S435. In this way, the service intelligent peripheral 170 waits until a determination is made that it has been disconnected at S435 (S435=Yes) or the timeout has expired at S440 (S440=Yes), and the process ends.

If the session ID is not an error (S425=No), the service intelligent peripheral 170 forwards a session ID OK code at S445. The service intelligent peripheral 170 then initiates a call flow with the calling party at S450 based on the information previously obtained by the host intelligent peripheral 150 and stored as the session information entry at the session database 180. The call flow of the service intelligent peripheral 170 at S450 corresponds to the passive period of the host intelligent peripheral 150 at S347.

When the call flow of the service intelligent peripheral 170 with the calling party ends, the service intelligent peripheral 170 updates the session database 180 at S455. After updating the session database 180 at S455, the service intelligent peripheral 170 sends an end of session code to the host intelligent peripheral 150 at S460. After sending the end of session code to the host intelligent peripheral 150 at S460, the service intelligent peripheral 170 determines whether it has been disconnected at S435 (S435=Yes) or whether the timeout expires at S440 (S440=Yes).

At S450, the call flow with the calling party is executed according to a routine that results in pre-recorded or digitally generated voice message being played to the calling party asking the calling party to provide information by, e.g., pressing buttons on the keypad of the calling party communication device 100 or speaking into the calling party communication device. If the calling party enters digits using the keypad, the service intelligent peripheral 170 collects the digits and translates the collected digits for processing according to the script. If the service intelligent peripheral 170 is controlled by the control point 155, the collected information is provided to the control point 155 and the control point 155 instructs the service intelligent peripheral 170 to play another message to the calling party according to the script. However, if the service intelligent peripheral 170 is a service node/intelligent peripheral, then the call flow proceeds according to determinations made by the service intelligent peripheral 170 or, for example, the application server 185.

Accordingly, the functionality of the service intelligent peripheral 170 is provided to the calling party at the request of the host intelligent peripheral 150. As is described above, the disparate intelligent peripherals 150, 170 are coordinated to provide an integrated service to the calling party.

As another example of the uses of the integrated disparate intelligent peripherals, a travel agency with a host intelligent peripheral 150 may wish to temporarily connect a calling party to a service intelligent peripheral 170. The service intelligent peripheral 170 may belong to a third party such as an airport authority, an airline or a governmental agency. The service intelligent peripheral 170 may provide updated flight status. Accordingly, by calling the travel agency, the calling party may be able to obtain information such as an updated flight status. Accordingly, the updated information in the databases associated with the service intelligent peripheral 170 may be easily accessed during a temporary three way call when a calling party calls a business. As a result, the calling party may only have to remember a single telephone number to obtain information from a variety of sources.

As another example of the uses of the integrated disparate intelligent peripherals, a service intelligent peripheral 170 may be loaded with functionality to obtain and store, e.g., voice information from a calling party. Accordingly, a service intelligent peripheral 170 may be provided with a voice recording capability to store, for example, a customer's acquiescence to a purchase. After the service intelligent peripheral 170 begins interacting with the calling party, the service intelligent peripheral 170 may, for example, prompt the calling party to say "Yes" if the calling party agrees to purchase an item for a specified price. A portion of the agreement may be recorded and stored in case a disagreement occurs in the future as to whether a customer actually agreed to a purchase.

Figure 5:
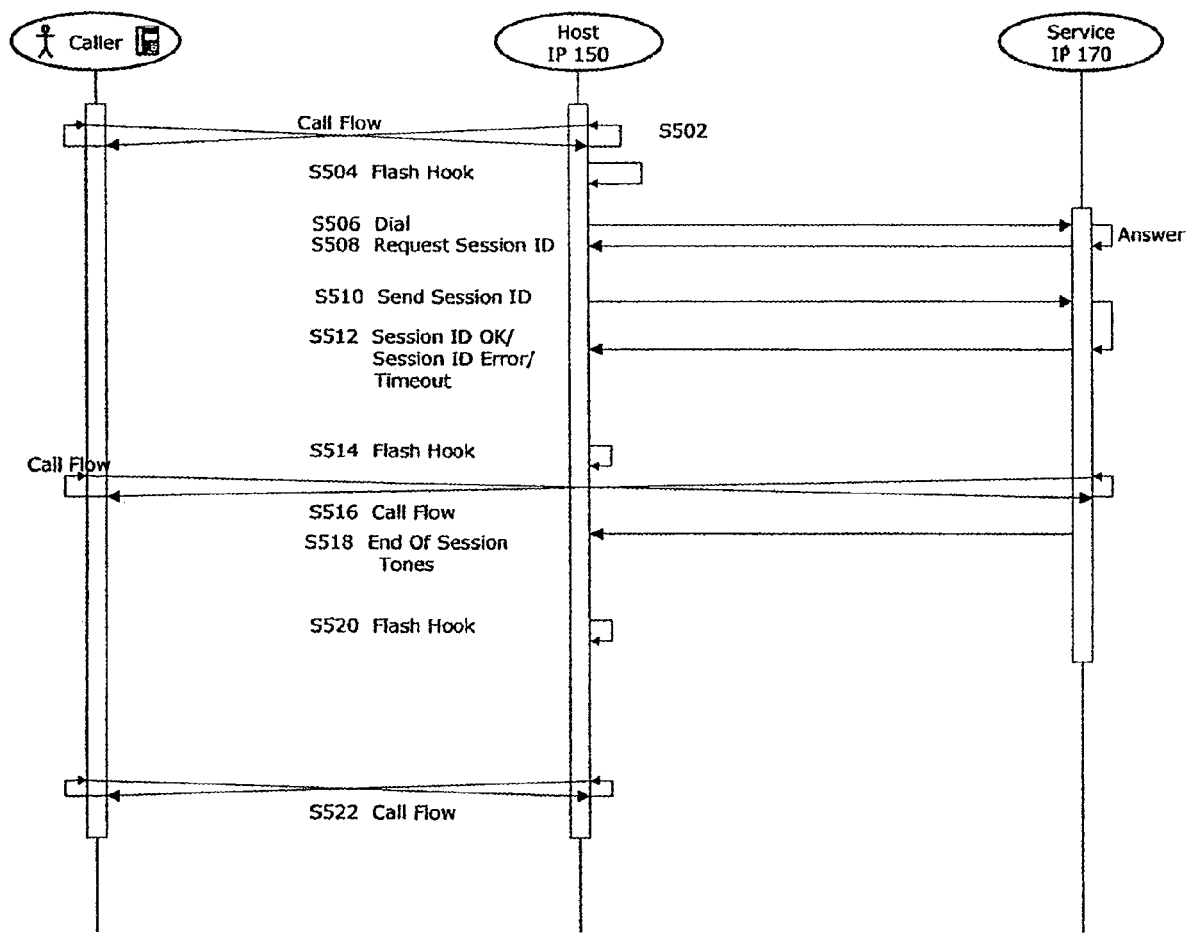
FIG. 5 is an exemplary call flow diagram for a call to the integrated disparate intelligent peripherals, according to an aspect of the present invention.

FIG. 5 shows an exemplary call flow for a call using the integrated disparate intelligent peripherals. At S502, the call flow between the calling party and the host intelligent peripheral 150 occurs. At S504, the host intelligent peripheral 150 performs a first flash hook to initiate a call to the service intelligent peripheral 170. At S506, the host intelligent peripheral 150 dials the service intelligent peripheral 170.

The service intelligent peripheral 170 answers the call and requests a session ID from the host intelligent peripheral 150 at S508. At S510, the host intelligent peripheral 150 forwards the session ID to the service intelligent peripheral 170. The host intelligent peripheral 150 acknowledges the session ID at S512 with either an OK signal or an Error signal. Additionally, the host intelligent peripheral 150 may forward a timeout expiration signal at S512 if no session ID is received.

If the session ID is OK, the host intelligent peripheral 150 performs a second flash hook at S514 to bridge the call between the calling party and the host intelligent peripheral 150 with the call between the host intelligent peripheral 150 and the service intelligent peripheral 170. At S516, the calling party interacts with the service intelligent peripheral 170. While the calling party interacts with the service intelligent peripheral 170, the host intelligent peripheral 150 passively monitors the call. At S518, the host intelligent peripheral 150 receives an end of session signal from the service intelligent peripheral 170. The end of session signal indicates that the service intelligent peripheral 170 has finished interacting with the calling party. Accordingly, at S520 the host intelligent peripheral 150 performs the third flash hook to disconnect the service intelligent peripheral 170 and end the three way call. At S522, the call flow between the calling party and the host intelligent peripheral 150 resumes.

Figure 6:
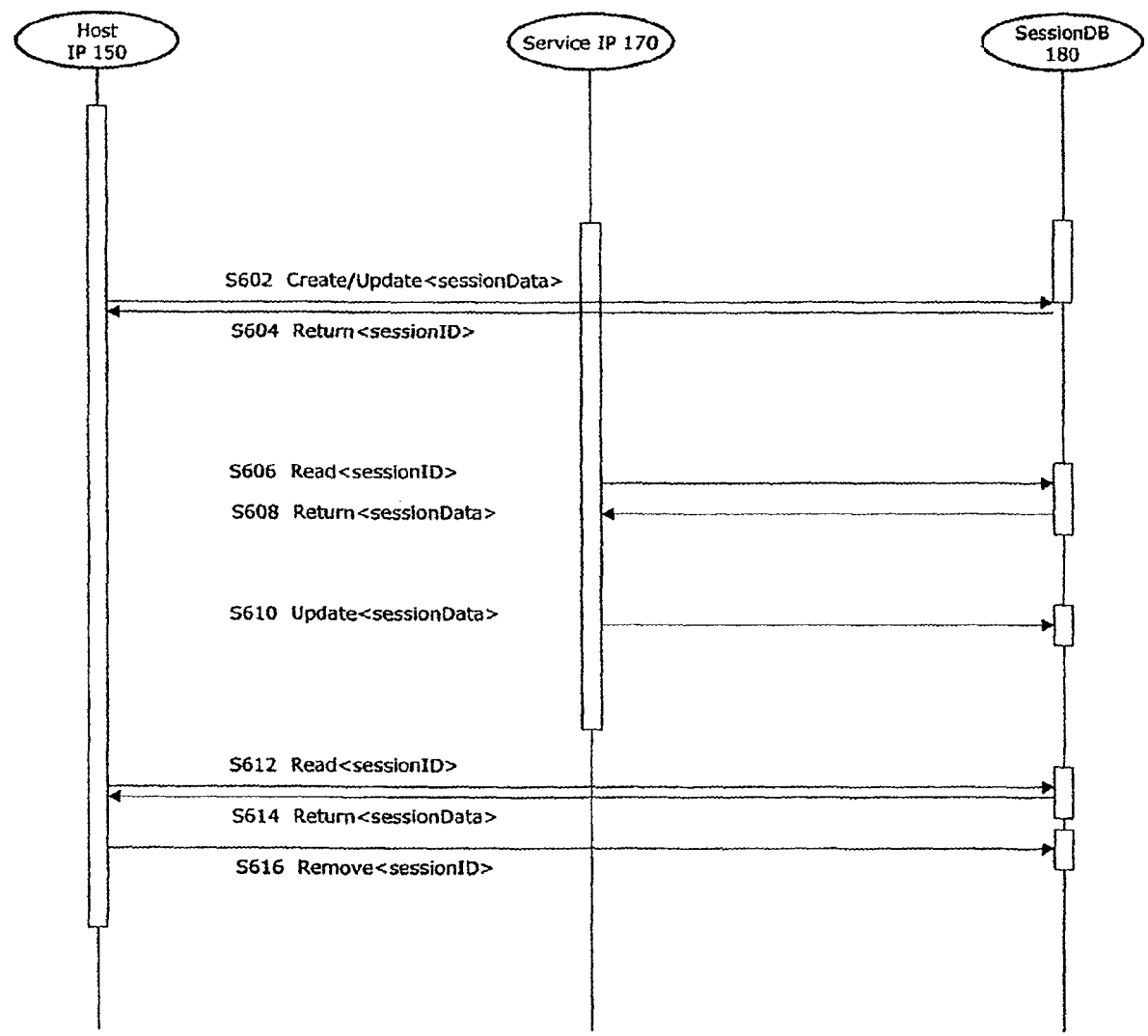
FIG. 6 is another exemplary call flow diagram showing a call flow of the integrated disparate intelligent peripherals and a shared session database, according to an aspect of the present invention.

FIG. 6 shows another exemplary call flow for a call using the integrated disparate intelligent peripherals and a shared session database 180. At S602, the host intelligent peripheral 150 creates a sessionData entry and forwards the entry to the session database 180 for storage. At S604, the session database 180 forwards a sessionID for the entry to the host intelligent peripheral 150.

The service intelligent peripheral 170 uses the sessionID at S606 to obtain the sessionData entry from the session database 180 at S608. At S610, the service intelligent peripheral 170 updates the sessionData for the session by forwarding the sessionData to the session database 180.

At S612, the host intelligent peripheral 150 uses the session ID to obtain the sessionData from the session database 180 at S614. At S616, the host intelligent peripheral 150 removes the sessionID from the session database 180.

Accordingly, the host intelligent peripheral 150 and the service intelligent peripheral 170 may indirectly share information by loading a session information entry into a session database 180. The loaded session information entry is retrieved by the next intelligent peripheral 150, 170 to interact with the calling party so that the information already collected from the calling party may be utilized.

Of course, the host intelligent peripheral 150 and the service intelligent peripheral 170 may also share information via the switch 105, the control point 155 or the wide area network 160 and local area network 190. However, the indirect communication using the session database 180 may be more efficient than, e.g., using DTMF tones for large amounts of data.

An exemplary use of the integrated disparate intelligent peripherals may include services for separate business entities. For example, a host intelligent peripheral 150 may belong to Zach's Chicago information service. A calling party calls Zach's and requests information on available hotel rooms on a particular date. Zach's host intelligent peripheral 150 may check a database and return a list of available hotels. The service may also offer to allow the calling party to reserve a room at a particular hotel. However, if the calling party agrees to reserve a room, the host intelligent peripheral 150 may require the calling party to provide information to a service intelligent peripheral 170 that belongs to the available hotel. Accordingly, the host intelligent peripheral 150 may perform a flash hook, dial the service intelligent peripheral 170 of the hotel, interact with the service intelligent peripheral 170, and perform a second flash hook to initiate the three way call. The call flow may then proceed until the hotel's service intelligent peripheral 170 has collected the required information, in which case the host intelligent peripheral 150 will then resume interaction with the calling party.

Of course, the integrated disparate intelligent peripherals may be used for many other purposes. As described above, the integrated disparate intelligent peripherals may be used to provide specific access to a service intelligent peripheral 170 of a third party vendor. Additionally, the integrated disparate intelligent peripherals may be used to provide access to a telecommunications provisioning system in order to request updates to a telecommunications service. Accordingly, the integrated disparate intelligent peripherals may be used in any environment where the functionality of a service intelligent peripheral 170 may be used to enhance the services of a host intelligent peripheral 150.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, instead of a three way call, the integrated disparate intelligent peripherals may use two separate calls, in which case the interaction between the intelligent peripherals occurs only indirectly via, for example, the control point 155. Additionally, timeouts may be used at any step of the present invention where an intelligent peripheral is waiting for a particular set of data. The present invention may also use error codes to signal, for example, that the host intelligent peripheral 150 should not resume interacting with the calling party, such as when the calling party provides a stolen credit card number to the service intelligent peripheral 170.

Additionally, the steps shown in the figures may be performed in a different order, or not be performed at all. Additional steps may also be performed by the integrated disparate intelligent peripherals. For example, S310 and S347 of FIG. 3, S450 of FIG. 4 and S502, S514 and S522 of FIG. 5 may each include a variety of interactions between the calling party and one of the intelligent peripherals 150, 170. Accordingly, any method of integrating disparate intelligent peripherals to provide an enhanced service may fall within the purview of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for channeled network transmissions (e.g. SS7, BR, PRI), packet switched network transmission (e.g., TCP/IP, VOIP), and interface protocols (e.g., SR-3511) represent examples of the state of the art. Such standards are periodically superseded by faster or more efficient equivalents having essentially the same functions. Accordingly, replacement standards and protocols having the same functions are considered equivalents.

I claim:

1. A method for providing a service, comprising:
   monitoring, by a first networked communications apparatus, interaction between a second networked communications apparatus and a remote requesting party over a first communications network; and
   automatically interacting, by the first networked communications apparatus, with the remote requesting party over the first communications network upon detecting a predetermined action in monitoring the interaction between the second networked communications apparatus and the remote requesting party over the first communications network.

2. The method of claim 1, further comprising:
interacting, by the first networked communications apparatus, with the second networked communications apparatus over a second communications network.

3. The method of claim 1,
wherein the first networked communications apparatus interacts with the remote requesting party according to a script.

4. The method of claim 3,
wherein the second networked communications apparatus interacts with the remote requesting party according to the script.

5. The method of claim 1,
wherein the second networked communications apparatus interacts with the remote requesting party according to a script.

6. The method of claim 1,
wherein the first networked communications apparatus interacts with the second networked communications apparatus by exchanging audible signals.

7. The method of claim 2, further comprising:
interacting, by the first networked communications apparatus, with the remote requesting party over the first communications network prior to interacting with the second networked communications apparatus over the second communications network.

8. The method of claim 7,
wherein the first networked communications apparatus begins interacting with the remote requesting party when the first networked communications apparatus receives a call from the remote requesting party over the first communications network.

9. The method of claim 1,
wherein the first networked communications apparatus interacts with the remote requesting party based on instructions from an external controller.

10. The method of claim 1,
wherein the second networked communications apparatus interacts with the remote requesting party based on instructions from an external controller.

11. The method of claim 2,
wherein the first networked communications apparatus begins interacting with the second networked communications apparatus when the first networked communications apparatus determines to contact the second networked communications apparatus based on information received from the remote requesting party.

12. The method of claim 7,
wherein the first networked communications apparatus interacting with the second networked communications apparatus comprises providing, from the first networked communications apparatus, information received by the first networked communications apparatus from the remote requesting party.

13. The method of claim 2,
wherein the first networked communications apparatus interacting with the second networked communications apparatus comprises establishing a three-party communications session so that the second networked communications apparatus interacts with the remote requesting party.

14. The method of claim 2,
wherein the first networked communications apparatus interacting with the second networked communications apparatus comprises an exchange of signals.

15. The method of claim 7, further comprising:
suspending interaction between the first networked communications apparatus and the remote requesting party over the first communications network prior to the interacting, by the first networked communications apparatus, with the second networked communications apparatus over the second communications network.

16. The method of claim 1,
wherein the remote requesting party comprises a computer processor.

17. The method of claim 1,
wherein the interaction between the remote requesting party and the first networked communications apparatus or the second networked communications apparatus comprises receiving a request for information from the remote requesting party and providing a response to the request for information to the remote requesting party.

18. The method of claim 1,
wherein the interaction between the remote requesting party and the first networked communications apparatus or the second networked communications apparatus comprises providing a request for information to the remote requesting party and receiving a response to the request for information from the remote requesting party.

19. The method of claim 1,
wherein interaction between the second networked communications apparatus and the remote requesting party is selectively initiated by the first networked communications apparatus to authenticate the remote requesting party.

20. A non-transitory computer readable medium that stores a program, executable by a first networked communications apparatus, for providing a service, the computer readable medium comprising:
a monitoring code segment, recorded on the computer readable medium, that monitors interaction between a second networked communications apparatus and a remote requesting party over a second communications network; and
an interacting code segment, recorded on the computer readable medium, that enables the first networked communications apparatus to automatically interact with the remote requesting party over the second communications network upon detecting a predetermined action in monitoring the interaction between the second networked communications apparatus and the remote requesting party over the second communications network.

21. A first networked communications apparatus for providing a service over a communications network, comprising:
a monitor that monitors interaction between a second networked communications apparatus and a remote requesting party over a second communications network; and
an interactor that automatically interacts with the remote requesting party over the second communications network upon detecting a predetermined action in monitoring the interaction between the second networked communications apparatus and the remote requesting party over the second communications network.

* * * * *